United States Patent Office 3,483,289
Patented Dec. 9, 1969

3,483,289
HUMAN NAIL COATING COMPOSITIONS
Joseph B. Michaelson, North Hollywood, and Angie F. Criswell, Sherman Oaks, Calif.; said Michaelson assignor to said Angie F. Criswell, Los Angeles, Calif.
No Drawing. Filed July 12, 1963, Ser. No. 294,706
Int. Cl. A61k 7/04
U.S. Cl. 424—61            9 Claims This invention has to do generally with improvements in the general category of human nail coatings, usable for the surfacing of natural nails or as polishes, or for repair of broken, chipped or cracked nails, as well as for the making and application of preformed nail overlays in the form of false nails and extenders, which I include in the broad class of nail coatings.

As is generally known, various base coatings have been prepared and marketed in the past for nail surfacing and repair purposes, and false or extender nails of various types and compositions have also been marketed. Not infrequently the conventional coatings in these categories have proven objectionable, if not demonstrably harmful, for various reasons, important among which are basic incompatibilities between the coating and natural nail compositions.

The present invention has for its general object to provide improved coating possessing all required and desirable physical properties, while formulated in such relation to or correspondence with the natural nail composition, as to have therewith compatibility that will obviate difficulties of the kind heretofore experienced.

In one significant respect the invention is predicated upon the use of coatings containing water insoluble albuminoids in the class of animal proteins, resistant to various solvents including salt solutions, dilute acids and alkalis and the like, and which form the basis for the above mentioned natural nail and coating compatability. Such albuminoids include keratin—from hair, horn, hoof and nails; elastin—from connective tissue and ligaments; collagen—from bones, cartilage, skin and tendons; spongin—from sponges; and fibroin and sericin—from silk. Of these, keratin is particularly desirable for various reasons, and will be referred to hereinafter as the preferred albuminoid.

It is found desirable to compound or formulate the keratin with what may be termed water insoluble bodying agent or material. The general purpose is to impart to the coating, necessary strength, body, hardness, polishability, adhesiveness and in general the total of those physical properties required for success of the composition in any or all of its coating usages. Suitable bodying materials are found in the general class of water insoluble cellulosic derivatives and water insoluble natural and synthetic resins. The properties of cellulosic derivatives, such as low order of toxicity, ease of use and low cost, render them particularly desirable as bodying materials.

These cellulosic derivatives are prepared from the cellulose molecule by esterification, etherfication, xanthation, addition substitution, and oxidation of the hydroxyl groups; or by degradation reaction including hydrolysis, oxidation, and decomposition. It is therefore possible to produce a wide variety of simple or complex compositions which by solution in suitable solvents become useful as protective coatings which harden primarily by solvent evaporation.

Examples of usable cellulose derivatives are as follows: cellulose nitrate (nitrocellulose)—formed by direct nitration with nitric acid; cellulose acetate—formed by action of acetic anhydride on cellulose; methyl and ethyl cellulose—formed by action of methyl or ethyl chloride on soda cellulose; benzyl cellulose—formed by action of benzyl chloride on cellulose; cellulose acetopropionate—formed by action of acetic and propionic anhydrides on cellulose; and cellulose acetobutyrate—formed by action of acetic and butyric anhydrides on cellulose.

Resins, natural and synthetic, may also be used as bodying materials to increase adhesion, to build solid content, to bolster gloss, to increase durability, and to provide water resistance. Examples of water insoluble natural resins are: dammar gum, mastic, sandarac, gum accroides, batu, elemi, resin gum, and ester gum (reaction product of glycerin and resin).

The following are examples of usable water insoluble synthetic resins: alkyd—produced from esterification of polybasic acids, fatty acids, and polyhydric alcohols, e.g., glyptal; alkylated methyol amino formaldehyde resins, e.g., urea-formaldehyde resins, malamine, casein, and zein; phenolic (phenolformaldehyde), phenol-formaldehyde and phenol-furfural resins; vinyl- polyvinyl acetate, polyvinyl chloride, polyvinyl butyrate, vinylidene chloride and copolymers of vinyl and polyvinyl acetates and butyrates; acrylic—polymethyl methacrylate and polyethylacrylate; sulfonamide-formaldehyde, a modifier for cellulose nitrate, made by reacting p-toluene sulfonamide with formaldehyde; maleic and maleic anhydride and linseed oil type resins. All of these resins can be used to modify cellulosics.

It is important to note that many of these resins require the usual catalysts in order to polymerize. In this respect the resins basically can be of two types: those producing a film through evaporative processes, and those producing a film via thermoplastic processes utilizing catalysts, and including thermosetting resins.

The keratin bodying agent composition is initially made by dissolution of materials in a suitable solvent or mixture of solvent, of which acetone, methyl ethyl ketone, one or more alkyl acetates, glycol ether, alcohols, and hydrocarbons both aromatic (e.g., toluene, xylene) and aliphatic (e.g., hexane) are illustrative.

Plasticizers may be used to impart flexibility to what otherwise would be excessive coating brittleness, usable plasticizers include castor oil, organic tartarates, organic phosphates, phthalates, camphor, and benzoates.

The following are examples of solutions usable for general purposes of nail coating and repair, as well as for adhering preformed overlays or false nails.

EXAMPLE 1

| Components: | Percent by Wt. |
|---|---|
| Acetone | 50.0 |
| Ethyl acetate | 16.5 |
| Cellulose nitrate | 12.5 |
| Butyl acetate | 10.0 |
| Keratin (powdered) | 8.0 |
| Dibutyl phthalate | 3.0 |
| | 100.0 |

EXAMPLE 2

| Components: | Percent by Wt. |
|---|---|
| Trifluorotrichloro ethane | 27.0 |
| Methylene chloride | 23.0 |
| Ethyl acetate | 15.0 |
| Acetone | 14.0 |
| Cellulose nitrate | 10.5 |
| Keratin (powdered) | 7.5 |
| Dibutyl phthalate | 3.0 |
| | 100.0 |

EXAMPLE 3

| Components: | Percent by Wt. |
|---|---|
| Acetone | 50.0 |
| Ethyl acetate | 16.5 |
| Cellulose nitrate | 10.0 |
| Butyl acetate | 10.0 |
| Resin (natural or synthetic) | 5.5 |
| Keratin | 5.0 |
| Dibutyl phthalate | 3.0 |
| | 100.0 |

EXAMPLE 4

| Components: | Percent by Wt. |
|---|---|
| Trifluorotrichloro ethane | 26.0 |
| Methylene chloride | 22.0 |
| Acetone | 15.0 |
| Ethyl acetate | 14.0 |
| Cellulose nitrate | 10.0 |
| Resin (natural or synthetic) | 5.0 |
| Keratin | 5.0 |
| Dibutyl phthalate | 3.0 |
| | 100.0 |

In all formulations the percentage of ingredients may be varied to produce special effects; e.g., increasing solvent proportions relative to other ingredients will produce products of low viscosity suitable for nail polish bases. Dyes or coloring agents may be added as desired, usually in the order of 0.1% or less.

EXAMPLE 5

The following is a representative starting material formulation from which nail overlays (false nails) can be made:

| Components: | Percent by Wt. |
|---|---|
| Cellulose nitrate | 12.5 |
| Acetone | 50.0 |
| Ethyl acetate | 15.0 |
| Butyl acetate | 10.0 |
| Keratin | 9.5 |
| Dibutyl phthalate | 3.0 |
| | 100.0 |

The albuminoid, or keratin, being insoluble, is used in finely particulate (400 to 20 mesh) form and becomes uniformly distributed or dispersed in the solution or solidified coating.

Allowing for other minor quantity components, the keratin content of the dried coating will range generally between about 4 to 15 weight percent, although for special purposes somewhat higher or lower than this range, and the bodying material will range generally between about 80 to 95 percent.

We claim:

1. Product for forming human nail coatings consisting essentially of a plasticizer, 4 to 15 parts by weight of a finely particulate, solid, water insoluble animal derived albuminoid selected from the group consisting of keratin, elastin, collagen, spongin, fibroin and sericin, about 80 to 95 parts of a water insoluble bodying material selected from the group consisting of cellulosic derivatives selected from the group consisting of cellulose nitrate, cellulose acetate, methyl cellulose, ethyl cellulose, benzyl cellulose, and acetobutyrate; natural resins selected from the group consisting of dammar gum, mastic, sandarac, gum accroides, batu, elemi, resin gum and ester gum; and synthetic resins selected from the group consisting of alkyd, methylol aminoformaldehyde, phenolfurfural, vinyl acetate, vinyl chloride, vinyl butyrate, vinylidene-chloride, acrylic, sulfonamide, maleic acid, maleic anhydride and linseed oil resins and an organic solvent for said bodying material.

2. Human nail coating composition according to claim 1 in which said water insoluble bodying material is one of said cellulosic derivatives.

3. A composition according to claim 1, in which said albuminoid is keratin.

4. A composition according to claim 1 in which said albuminoid is between 400 and 20 mesh in particle size.

5. A composition according to claim 2 in which said cellulosic bodying material is cellulose nitrate.

6. A composition according to claim 5 in which said albuminoid is keratin.

7. A composition according to claim 6 in which said keratin has a particle size between 400 and 20 mesh.

8. A composition according to claim 7 in which said organic solvent is selected from the group consisting of methyl ethyl ketone and acetone.

9. A composition according to claim 8 in which said solvent is methyl ethyl ketone.

References Cited

UNITED STATES PATENTS

| 1,942,332 | 1/1934 | Hamberg | 132—73 |
| 2,383,990 | 9/1945 | Quisling | 107—85 |
| 2,145,856 | 2/1939 | Bley | 106—158 |

OTHER REFERENCES

Sagarin: Cosmetics Science and Technology (1957), pp. 678–683, P.OS.L.

ALBERT T. MEYERS, Primary Examiner

STANLEY J. FRIEDMAN, Assistant Examiner

U.S. Cl. X.R.

106—124, 155, 158, 161; 132—73